United States Patent
Qian et al.

(10) Patent No.: US 9,124,326 B2
(45) Date of Patent: Sep. 1, 2015

(54) LOOK-UP TABLE BASED DIGITAL FILTER ARRAY USING DIGITAL TRANSMITTER

(71) Applicant: NEC Laboratories America, Inc., Princeton, NJ (US)

(72) Inventors: Dayou Qian, Princeton, NJ (US); Eduardo Mateo Rodriquez, Tokyo (JP); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/205,629

(22) Filed: Mar. 12, 2014

(65) Prior Publication Data

US 2014/0269980 A1    Sep. 18, 2014

Related U.S. Application Data

(60) Provisional application No. 61/778,663, filed on Mar. 13, 2013.

(51) Int. Cl.
*H04L 27/00* (2006.01)
*H04B 1/04* (2006.01)

(52) U.S. Cl.
CPC .................... *H04B 1/0483* (2013.01)

(58) Field of Classification Search
CPC .. H04B 1/0003; H04B 1/0483; H04B 1/0017; H04B 2210/006; H04B 10/50; H04B 10/58; H04L 25/03343; H04L 27/2637; H04L 2025/03414; H04L 27/00; H04L 27/2626; H04L 27/2636; H04L 27/362; H04L 12/28
USPC ................. 375/295, 299, 267; 455/102, 103, 455/114.3, 143, 168.1; 708/300, 819
See application file for complete search history.

(56) References Cited

U.S. PATENT DOCUMENTS

2003/0088390 A1* 5/2003 Jamsa et al. ...................... 703/5
2009/0232237 A1* 9/2009 Nakanishi et al. ............ 375/260

* cited by examiner

*Primary Examiner* — Rahel Guarino
(74) *Attorney, Agent, or Firm* — Joseph Kolodka

(57) ABSTRACT

Disclosed are structures and methods for slicing a broadband signal into multiple, narrower bandwidth sub-bands through the use of a look-up table (LUT). An input broadband signal is first loaded by a pre-defined LUT. The LUT is designed with multiple parallel outputs, wherein each output is one individual sub-band.

1 Claim, 6 Drawing Sheets

LOOK-UP TABLE BASED DIGITAL FILTER ARRAY USING DIGITAL TRANSMITTER

CROSS REFERENCE TO RELATED APPLICATIONS

This application claims the benefit of U.S. Provisional Patent Application Ser. No. 61/778,663 filed Mar. 13, 2013 for all purposes as if set forth at length herein.

TECHNICAL FIELD

This disclosure relates generally to the field of optical communications and in particular to look-up table based digital filter array using a digital transmitter.

BACKGROUND

The widespread use and subsequent evolution of broadband optical communications systems has necessitated the development of methods, systems and structures that facilitate the "slicing" or decomposing of a broadband signal into multiple, narrower bandwidth sub-band signals. Accordingly, such methods, systems and structures that facilitate such broadband slicing would represent a welcome addition to the art.

SUMMARY

An advance in the art is made according to an aspect of the present disclosure directed to a method and structures for performing slicing of a broadband optical signal into multiple, narrower bandwidth sub-bands through the use of a look-up table (LUT). According to an aspect of the present disclosure, an input broadband optical signal is first loaded by a pre-defined LUT. The LUT is advantageously designed such that it produces multiple parallel outputs wherein each individual one of the multiple outputs is one sub-band.

In sharp contrast to prior art approaches, methods and structures according to the present disclosure replace high-resource consuming multiplication operation(s) with look-up table search/add operations so that any required resources for the FIR/FDE filter(s) is reduced. Additionally according to the present disclosure, the multiple look-up tables are previously established with off-line processing. Finally, structures and methods according to the present disclosure may be combined with other linear filters such as pre-CDC filters without significantly increasing complexity and/or resource utilization.

BRIEF DESCRIPTION OF THE DRAWING

A more complete understanding of the present disclosure may be realized by reference to the accompanying drawing in which.

DETAILED DESCRIPTION

Figure 1:
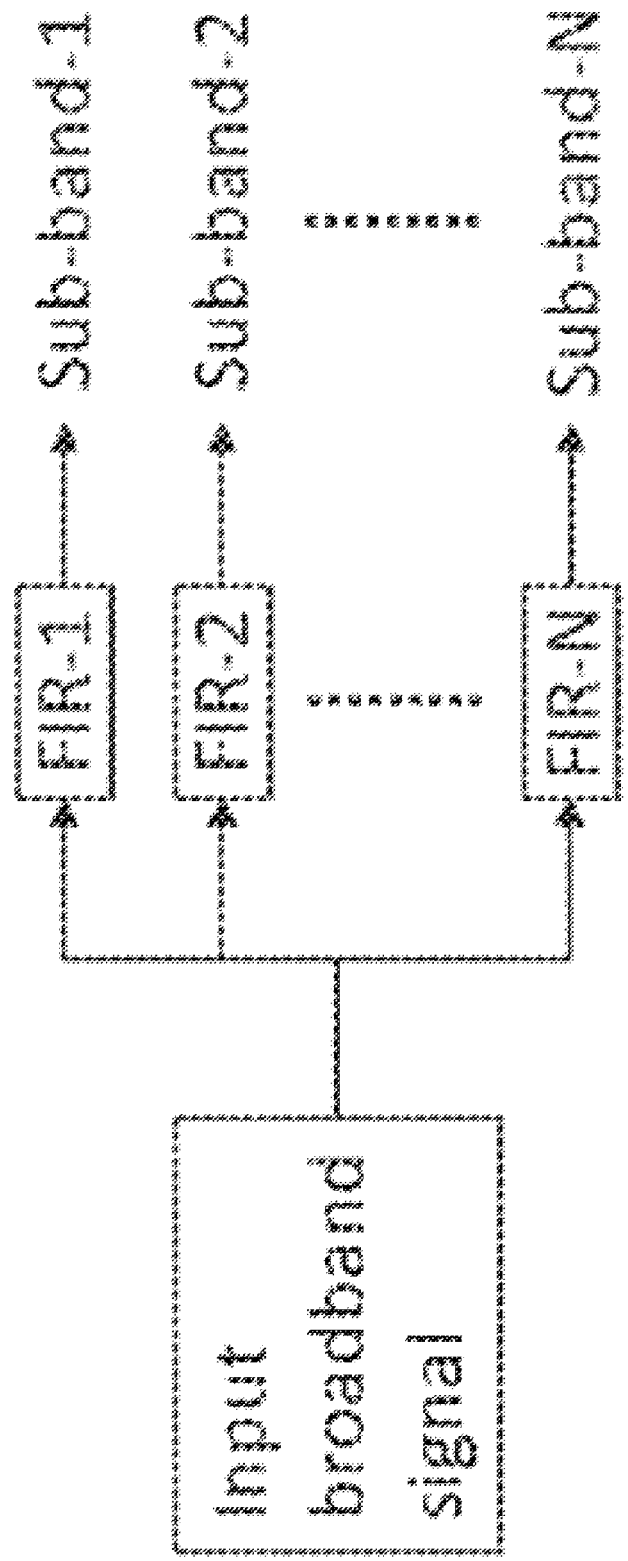
FIG. 1 depicts a schematic block diagram of a generic architecture for generating sub-bands using a finite impulse response (FIR) filter array.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

Thus, for example, it will be appreciated by those skilled in the art that the diagrams herein represent conceptual views of illustrative structures embodying the principles of the disclosure.

By way of some additional background, we begin by noting that in optical communications systems there exists a continuing need to slice a broadband optical signal into multiple, narrower sub-bands. Oftentimes, such slicing is used in conjunction with digital signal processors, FIR filters or FFT/IFFT filters. As is known, such slicing techniques are oftentimes time consuming or intensive.

More particularly, and with initial reference to FIG. 1, there it shows a schematic block diagram depicting slicing of a broadband optical signal into a number (N) of sub-bands through the effect of a FIR filter array. As depicted in that FIG. 1, in input broadband signal is applied to an array of FIR filters (FIR 1, FIR 2, . . . FIR N) which in turn output the N sub-bands (sub-band 1, sub-band 2, . . . sub-band N). Those skilled in the art will readily understand that with such FIR approaches, the multiple FIR filters are designed for each sub-band through their starting and ending frequencies. The broadband input signal is processed by all of the FIR filters in parallel, and the output of each individual FIR filter is one sub-band signal.

Figure 2:
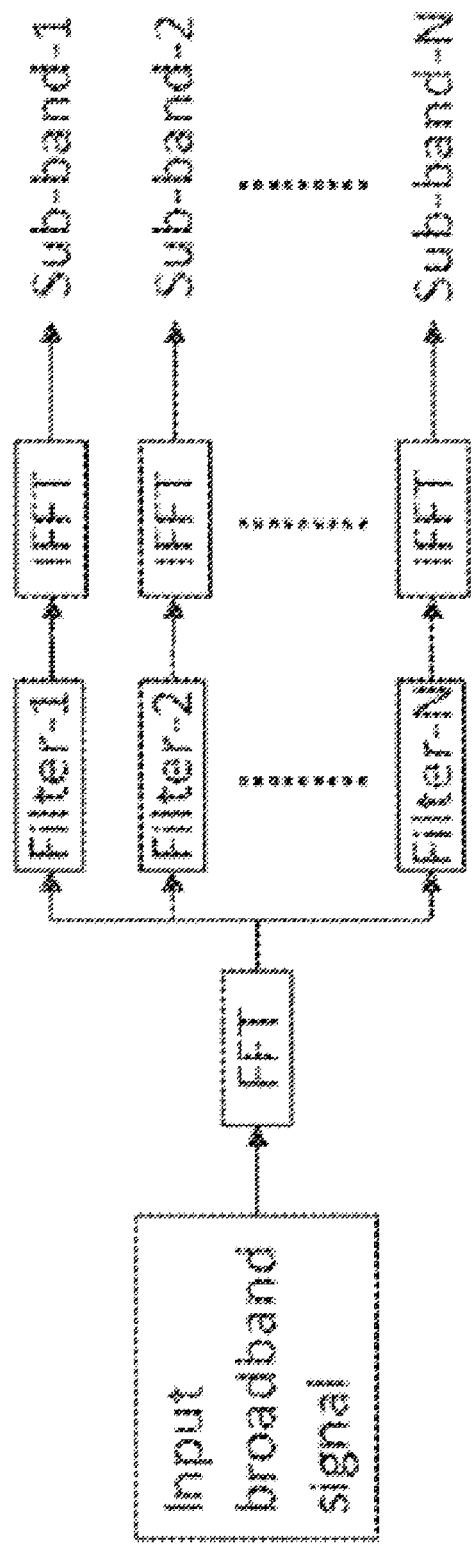
FIG. 2 depicts a schematic block diagram of a generic architecture for generating sub-bands using a fast fourier transform/inverse fast fourier transform (FFT/IFFT) filter array.

Turning now to FIG. 2, there it shows a schematic block diagram depicting the slicing of a broadband optical signal into a number (N) of sub-bands through the effect of an FFT/IFFT filter array. As depicted therein, an input broadband signal is first transformed into the frequency domain through the effect of a FFT. The frequency domain signal is applied to a series of rectangular one tap filters (Filter 1, Filter 2, . . . Filter N) by which it is sliced into frequency domain sub-bands. The frequency domain sub-bands are then converted to time-domain signals through the effect of multiple IFFT modules.

Figure 3:
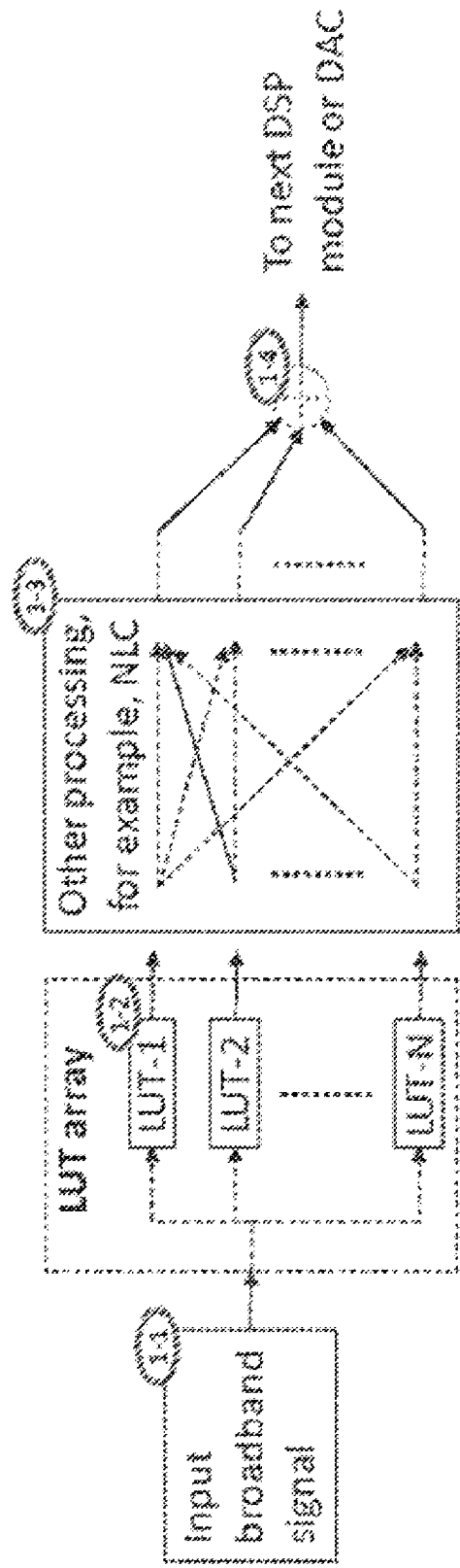
FIG. 3 depicts a schematic block diagram of sub-band generation and processing using a LUT array according to an aspect of the present disclosure.

In sharp contrast to the structures and methods depicted in FIG. 1 and FIG. 2, the slicing structures and methods according to the present disclosure employ LUTs to generate the sub-bands from a broadband optical signal. More specifically—and as shown in FIG. 3, the input broadband optical signal is first loaded by a pre-defined LUT. The LUT is advantageously designed and/or configured with multiple parallel outputs. Each output signal is one sub-band. As depicted in the FIG. 3, the input broadband signal is applied to the LUT array (LUT-1, LUT-2, . . . LUT-N) which outputs the various sub-bands. As depicted in that FIG. 3, further processing of the sub-bands may take place before eventual output to additional digital signal processors (DSP) or digital to analog converter (DAC) modules.

As may be appreciated by those skilled in the art, approaches according to the present disclosure advantageously reduce implementation complexity and resource utilization for sub-band slicing. Of further advantage, devices according to the present disclosure may exhibit a reduced size and power consumption.

In sharp contrast prior art approaches such as those depicted in FIG. 1 and FIG. 2, oftentimes employed multiple FIR or FDE filters which are operated in real-time mode for convolution processing. As may be appreciated, such approaches require very high computing complexity which limits its applicability to contemporary CMOS technologies.

Figure 4:
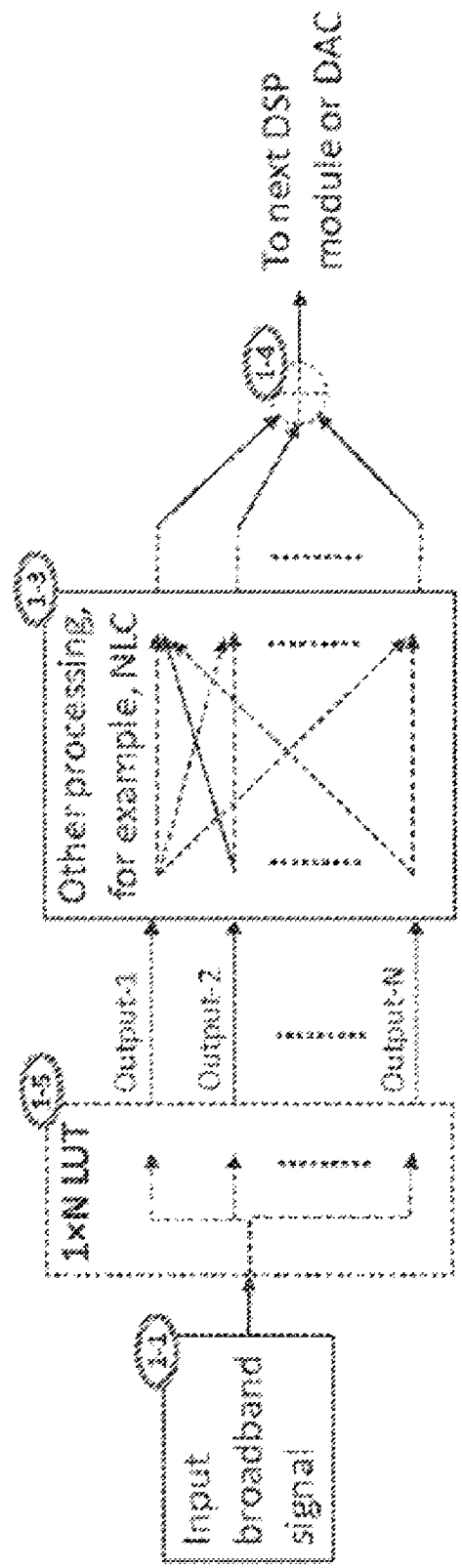
FIG. 4 depicts a schematic block diagram of sub-band generation and processing using a 1×N LUT array according to an aspect of the present disclosure.

FIG. 4 depicts a schematic block diagram of sub-band generation and processing using a 1×N LUT array according to an aspect of the present disclosure.

Figure 5:
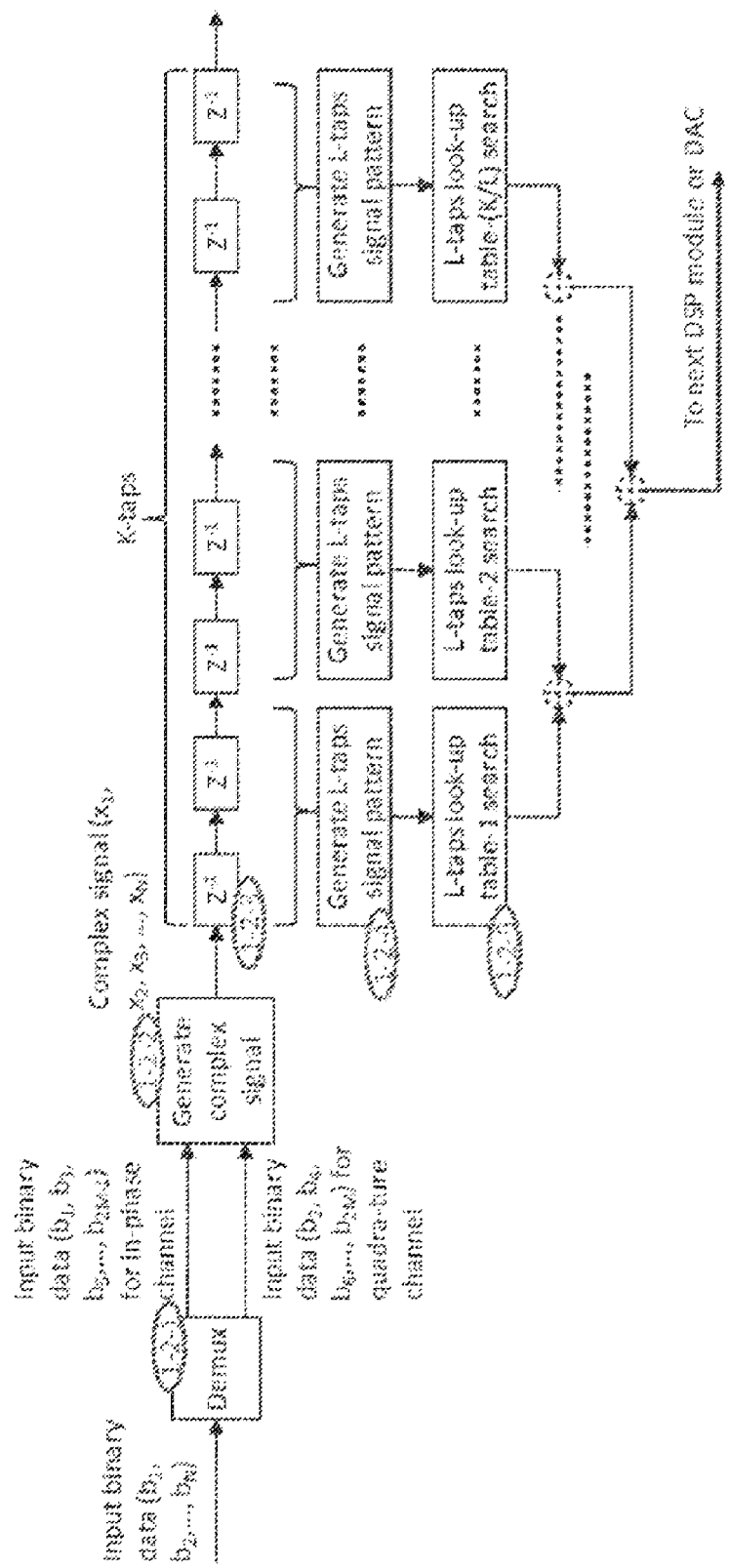
FIG. 5 depicts a schematic block diagram of bandwidth slicing using a LUT array according to an aspect of the present disclosure.

FIG. 5 depicts a schematic block diagram of bandwidth slicing based on a LUT according to the present disclosure. More specifically, an input binary data stream ($b_1, b_2, \ldots b_N$) is applied to a demultiplexer which demultiplexes the input binary data stream into inphase ($b_1, b_3, b_5, \ldots b_{2M-1}$ and quadrature ($b_2, b_4, b_6, \ldots b_{2M}$) data streams which are processed such that a complex data stream/signal ($x_1, x_2, x_3, \ldots x_N$) is produced. The complex signal is applied to a series of K-taps which in turn produce generate a series of L-taps signal pattern(s) which are further used for L-taps look up table searches (table-1 search, table-2 search, . . . table (K/L) search).

Figure 6:
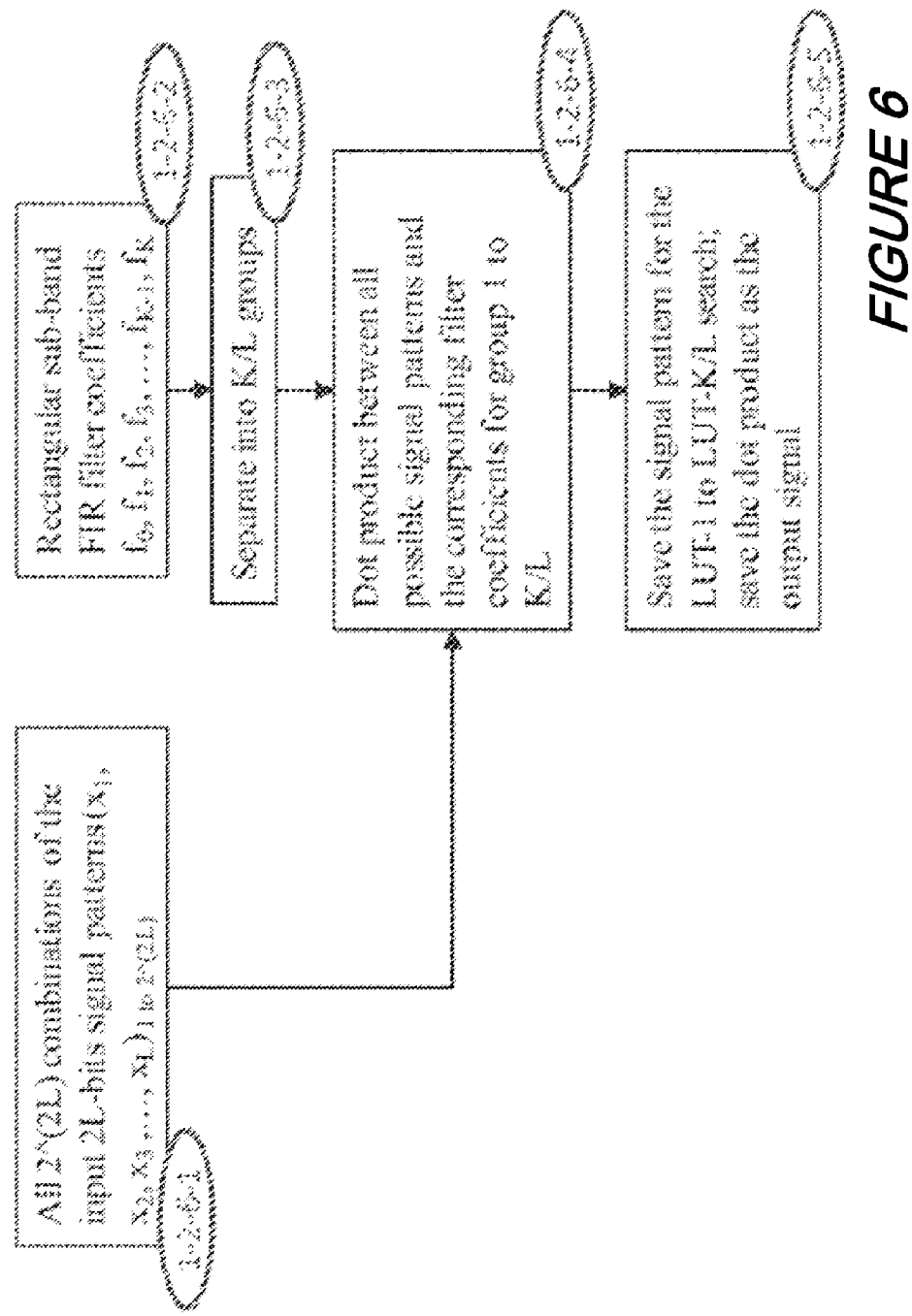
FIG. 6 depicts a schematic block diagram of look-up table generation for sub-band generation according to an aspect of the present disclosure.

Finally, FIG. 6 depicts a schematic block diagram of look-up table generation for sub-band slicing according to an aspect of the present disclosure. As depicted therein, from all $2^{(2L)}$ combinations of an input 2L-bits signal pattern, a dot product between all possible signal patterns and the corresponding filter coefficients for group 1 to K/L are produced wherein rectangular sub-band FIR filter coefficients ($f_0, f_1, f_2, f_3, \ldots, f_{K-1}, f_K$) are separated into K/L groups. The signal pattern(s) for the LUT-1 to LUT-K/L search(es) are saved and the dot product is output as the output signal(s).

At this point, the foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method of communicating using a broadband input signal with look-up table generation for sub-band slicing; comprising the steps of:

applying an input binary data stream ($b_1, b_2, \ldots b_N$) to a demultiplexer;

demultiplexing the input data stream into inphase ($b_1, b_3, b_5, \ldots b_{2M-1}$) and quadrature ($b_2, b_4, b_6, \ldots b_{2M}$) data streams;

processing the inphase and quadrature data streams such that such that a complex data stream/signal ($x_1, x_2, x_3, \ldots x_N$) is produced;

applying the complex signal to a series of K-taps such that a series of L-taps signal pattern(s) are produced;

using the L-taps signal patterns to perform look up table searches (table-1 search, table-2 search, . . . table (K/L) search), wherein the result of the individual look up table search is an individual sub-band; and outputting the individual sub-band to wirelessly communicate data stream over the broadband input signal to a receiver.

* * * * *